Patented May 19, 1942

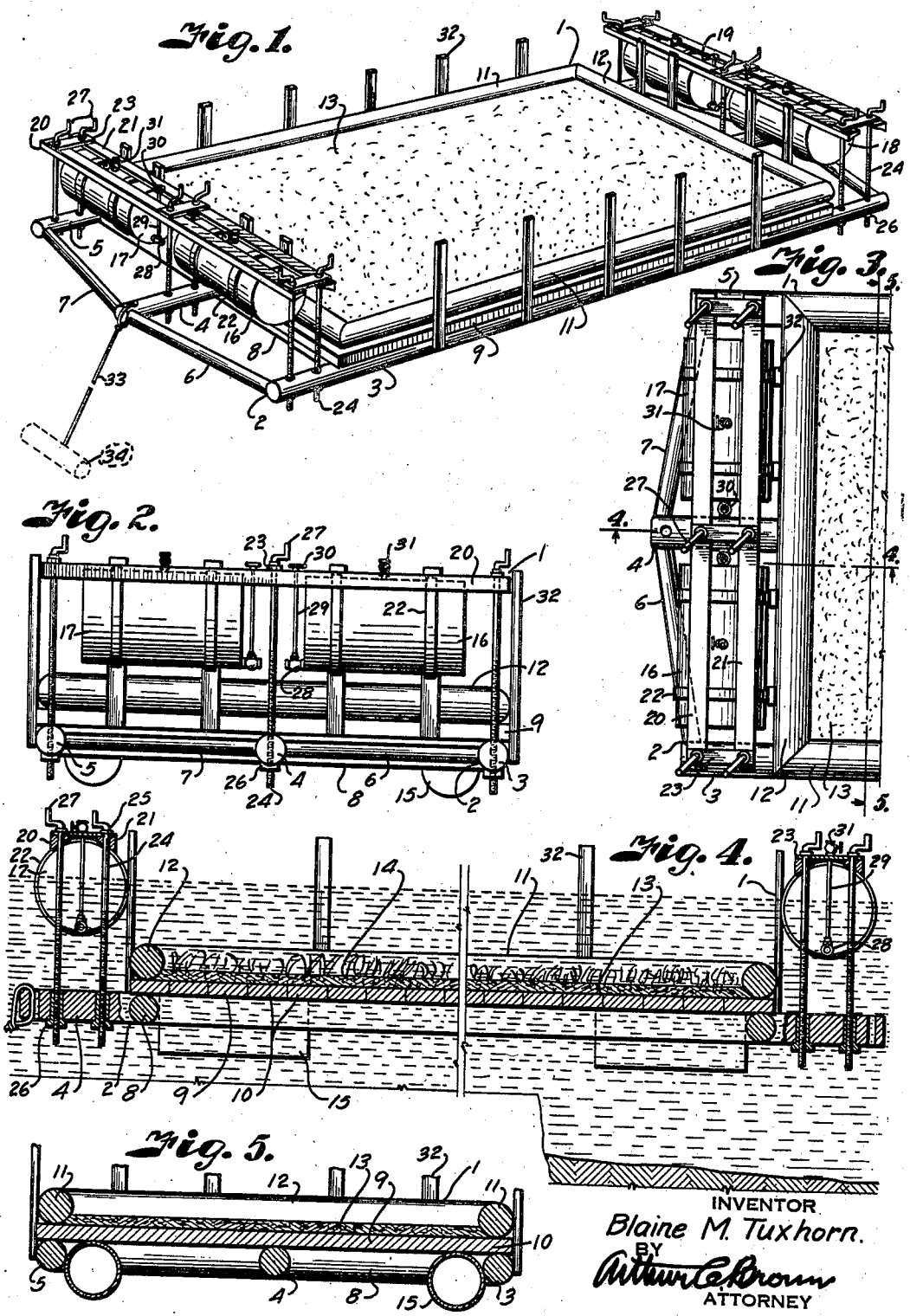

2,283,472

UNITED STATES PATENT OFFICE 2,283,472

APPARATUS FOR ESTABLISHING FISH HABITATS

Blaine M. Tuxhorn, Kansas City, Mo.

Application October 25, 1939, Serial No. 301,223

4 Claims. (Cl. 119—3)

This invention relates to an apparatus for establishing fish habitats, such as aquatic gardens, to promote the care, protection and propagation of fish in lakes, streams, and the like, having widely fluctuating water-levels. For example, the Lake of the Ozarks in Missouri is a most favorable site for aquatic sports such as fishing, and the lake has, therefore, been stocked with great numbers of fish, but these fish have not thrived and propagated as was expected for the reason that the water-level of the lake fluctuates to such an extent that it is impossible for aquatic vegetation to grow along the banks thereof, with the result that the fish do not obtain the foods necessary for habitation, or the coverage and protection essential for promoting propagation of young fish.

Variation in the water-level is brought about through wide variation in rainfall in the watersheds supplying the lake, and the rate at which the water is drawn down in operating the electrical generators of the power station for which the lake was constructed. During the rainy season of the year, which usually covers the spawning period, the water-level is kept high in order to supply the power station with sufficient water to last through the dry seasons and to avoid floods below the down-river side of the dam. Consequently the lake extends out into the shallow arms and creeks and the fish deposit their eggs on the grasses, shrubs, and similar vegetation. To avoid floods in the lake region, the water is drawn down through opening of the flood gates at the dam, with the result that the deposited eggs are destroyed through exposure incidental to the receding water-level.

In dry seasons the water recedes below the level at which aquatic vegetation may have started to grow when the water was high, leaving the plants to dry up and die. If the arid season preponderates and the rainfall is light, the water is used faster than the lake can fill so that the banks of the lake are entirely free of vegetation along the water-line which is necessary in supplying food, cover, and protection for the fish.

This seasonal fluctuation in water-level may be as much as twenty feet, and during intermediate periods the water-level is fluctuating constantly to as much as two or five feet. It is thus obvious that constant drying and flooding of the banks cannot accommodate growth of aquatic plants and it is necessary to provide some form of conservatory and propagatory means for the fish.

It is, therefore, the principal object of the present invention to provide an apparatus adapted to float with the rise and fall of the water, and in which the aquatic plants are grown for the habitation and conservation of fish, frogs, and water animals.

Other objects of the invention are to provide an apparatus of this character which is not hazardous to boats in navigable lakes and streams; to provide floating apparatus adapted to be maintained in submerged condition at any selective depth best suited to the particular form of water-plants carried thereby; and to provide a simple and inexpensive apparatus which may be made of materials readily available at the site.

In accomplishing these and other objects of the invention, as hereinafter pointed out, I have provided improved details of structure, the preferred form of which is illustrated in the accompanying drawing, wherein:

Fig. 1 is a perspective view of a submerged raft for containing soil, rocks and gravel necessary to the growth of aquatic plants and providing the necessary habitat for large fish during the spawning season and for the propagation of the small fish.

Fig. 2 is an end elevational view thereof.

Fig. 3 is a plan view of one end thereof.

Fig. 4 is a longitudinal section on the line 4—4 of Fig. 3.

Fig. 5 is a cross-section on the line 5—5 of Fig. 3.

Referring more in detail to the drawing:

1 designates a submergible floating raft-like structure adapted for the support of soil, rocks, and materials necessary for the growth of aquatic plants necessary in the habitation, protection and conservation of fish in bodies of water having widely varying levels, and which includes a frame 2 formed of longitudinal sills such as poles or beams 3, 4 and 5, preferably of floatable material and having their ends connected by rails 6—7 diverging from the side sills 3 and 5 toward the central sill 4 and connected therewith by any suitable fastening means, such as nails, bolts, thongs or the like. The sills 3, 4 and 5 may also be connected at points spaced inwardly from their ends by transverse poles or beams 8 to provide a platform on which is mounted a flooring 9, consisting of planks 10 laid transversely of the longitudinal sills and secured thereto by suitable fastening means such as nails or the like.

Secured on the marginal edges of the platform are side and end members 11 and 12, cooperating with the flooring in forming an open top container adapted to carry soil, rock, gravel, or similar material 13 in which the aquatic plants designated 14 may be planted and caused to grow. The raft structure is buoyed sufficiently so that it substantially balances in the water by means of air tanks 15 secured under the platform and preferably arranged along the longitudinal sills 3 and 5, as clearly shown in Figs. 4 and 5.

With the raft-like structure thus balanced it may be readily maintained at any desired level below the surface of the water by means of buoys, which in the illustrated instance comprise tanks 16—17 and 18—19 arranged at the respective ends of the raft and offset laterally from the bed of material 13, the tanks at the respective ends being secured together by rails 20 and 21 supported on the tops thereof and which are secured by bands 22 extending around the tanks and attached to the rails. The rails are also connected by cross members 23 located in registry with the ends of the side sills, to mount threaded shafts 24 having their upper ends journalled within suitable bearings 25 in the members 23 and their lower ends engaged in threaded bushings 26 fixed within the longitudinal sills. The upper ends of the shafts terminate in cranks 27 whereby the shafts may be rotated to raise and lower the floating tanks in respect to the raft.

In order to maintain the raft in submerged condition, the floating tanks are each partially filled with water through a valve 28 connected with the lower portion of the tank. The valves 28 are operated by stems 29, which extend above the water and are provided with hand-wheels 30. The upper portions of the tanks are provided with valve connections 31 by which water may be pumped from the tanks to prevent submergence of the raft below the desired level, as in case the parts become water-logged.

In order to serve as a warning to boats and advise the extent of the area covered by the submerged raft, the sides thereof carry upstanding posts or guards 32, which project above the water-level and are painted, together with the upper portions of the buoys, so that they are readily observable. Either one, or both, of the ends of the raft may be anchored in position by cables 33 attached to the ends of the center sill and to anchors 34 resting upon or buried in the bottom of the lake. The parts of the raft may be treated with water-proofing materials to avoid water-logging so that the raft is kept at a constant depth as set by the buoys.

In using the invention, rafts of the character described may be anchored at various points along the marginal edges of the lake so that they rise and fall with the level of the water. The aquatic plants, being kept at the desired depth, multiply and provide the necessary food, protection for the small fish, and places for deposit of eggs so that the fish soon multiply and keep the lake in stocked condition. If desired, the soil may be mounded upon the raft so that portions thereof are slightly below the water-level. Therefore aquatic plants may be set at the depth they grow best and an assortment of plants having different characteristics may be planted in the same raft. The mounds also provide depositories for the eggs of types of fish which deposit their eggs on soil close to the water-level. Attention is directed to the fact that the buoys are so located that they do not interfere with growth of the aquatic plants, nor do they exclude the sun's rays from penetrating the water to supply the aquatic plants with light.

From the foregoing it is obvious that I have provided a simple and inexpensive apparatus which is adapted to maintain the necessary aquatic gardens required for the habitation, conservation or propagation of fish, so that streams, lakes, and the like, having widely fluctuating water-levels soon become good fishing places for sportsmen. What I claim and desire to secure by Letters Patent is:

1. Apparatus for promoting conservation of fish in a body of water having varying levels including, a substantially raft-like platform, material supported on said platform for growing aquatic plants, said raft-like platform and materials being of sufficient weight to sink below the surface of the water, buoys offset laterally of the bounds of said bed of material and adapted to float on the surface of the water, and means suspendedly connecting said buoys with the raft-like platform to support said raft-like platform a predetermined distance below the surface of the water.

2. Apparatus for promoting conservation of fish in a body of water having varying levels including, a substantially raft-like platform, material supported on said platform for growing aquatic plants, said raft-like platform and materials being of sufficient weight to sink below the surface of the water, buoys adapted to float on the surface of the water, said raft-like platform having portions projecting beyond the bed of material, and means suspendedly connecting said buoys with said projecting portions of the raft-like platform to support said raft-like platform a predetermined distance below the surface of the water, said connecting means being adjustable to vary said predetermined depth in accordance with the height of the aquatic plants growing in said materials.

3. Apparatus for promoting conservation of fish in a body of water having variable levels including, a raft-like support, a bed of materials for growing aquatic plants carried on the raft-like support, said bed of materials and raft-like support being sinkable in the water, buoyant means connected with the raft-like support for substantially carrying said raft-like support submerged in the water, floats offset laterally from the bounds of the bed of materials and adapted to float upon the surface of the water out of the way of the aquatic plants, and means connectedly suspending the raft-like support from said floats, said connecting means being adjustable for selectively varying submergence of said raft-like support.

4. Apparatus for promoting conservation of fish in a body of water having variable levels including, a frame, a platform carried on the frame, a bed of material on the platform for growing aquatic plants, said bed of material, platform and frame being of sufficient weight to sink below the surface of said water, a plurality of floatable tanks, frames supported on said tanks, and threaded shafts connecting the frames supported by the floatable tanks with the frame carrying said platform, said shafts being threadedly connected with one of said frames to vary the submergence depth of said bed of materials.

BLAINE M. TUXHORN.